(12) United States Patent
Childress (10) Patent No.: US 6,479,138 B1
(45) Date of Patent: Nov. 12, 2002

(54) LOW SHRINK TENSION FILM

(75) Inventor: Blaine Childress, Inman, SC (US)

(73) Assignee: Cryovac, Inc., Duncan, SC (US)

(*) Notice: Subject to any disclaimer, the term of this patent is extended or adjusted under 35 U.S.C. 154(b) by 17 days.

(21) Appl. No.: 09/795,014

(22) Filed: Feb. 27, 2001

(51) Int. Cl.$^7$ .............................. B32B 7/02; B32B 27/30
(52) U.S. Cl. ..................... 428/213; 428/215; 428/216; 428/516; 428/517; 428/519; 428/520; 428/910
(58) Field of Search ................................. 428/213, 215, 428/216, 516, 517, 519, 520, 910

(56) References Cited

U.S. PATENT DOCUMENTS

| | | | |
|---|---|---|---|
| 4,194,039 A | 3/1980 | Mueller | 428/213 |
| 4,352,849 A | 10/1982 | Mueller | 428/213 |
| 4,532,189 A | 7/1985 | Mueller | 428/516 |
| 4,833,024 A | 5/1989 | Mueller | 428/349 |
| 5,023,143 A | 6/1991 | Nelson | 428/516 |
| 5,658,625 A | 8/1997 | Bradfute et al. | 428/34.9 |
| 5,703,187 A | 12/1997 | Timmers | 526/282 |
| 5,861,201 A | 1/1999 | Blackwelder et al. | 428/36.91 |
| 5,888,615 A | 3/1999 | Mascarenhas et al. | 428/141 |
| 6,194,501 B1 | 2/2001 | Okada et al. | 524/274 |
| 6,344,250 B1 | 2/2002 | Arthurs | 428/34.9 |
| RE37,699 E | 5/2002 | Bradfute et al. | 428/34.9 |

FOREIGN PATENT DOCUMENTS

| | | |
|---|---|---|
| EP | 0 572 990 A2 | 8/1993 |
| EP | WO 00/47643 | 8/2000 |
| WO | WO 95/32095 | 11/1995 |

Primary Examiner—D. S. Nakarani
(74) Attorney, Agent, or Firm—Mark B. Quatt (57) ABSTRACT

A film includes a core layer including a linear random alpha-olefin/vinyl aromatic copolymer; and first and second outer layers including an olefinic polymer; the film having Young's modulus between 50,000 and 200,000 psi, free shrink between 40 and 80% at 240° F., and shrink tension of between 50 and 400 psi, or a shrink force of between 20 and 180 grams, at 240° F. First and second intermediate layers including an ethylene copolymer having a melt index less than 2.0 can be optionally included. Alternatively, a film includes a core layer including an ethylene copolymer having melt index less than 2.0; first and second intermediate layers including a linear random alpha-olefin/vinyl aromatic copolymer; and first and second outer layers including an olefinic polymer; the film having properties as disclosed above.

28 Claims, 2 Drawing Sheets

LOW SHRINK TENSION FILM

FIELD OF THE INVENTION

The present invention relates to an oriented, heat shrinkable thermoplastic film.

BACKGROUND OF THE INVENTION

"Soft shrink" films are known in the art. These films offer relatively high free shrink combined with relatively low shrink tension. They are suitable for packaging articles, such as textiles and paper, that are sensitive to, or whose packaged appearance suffers from effects, such as distortion, of a film with too high a shrink tension.

An example of such films is poly(vinyl chloride) (hereinafter "PVC") film. PVC film exhibits good elastic recovery, high modulus, and low shrink tension. Unfortunately, PVC film suffers from poor sealability, low free shrink, and poor tear resistance. It also carbonizes during a heat sealing process, releasing hydrogen chloride. The ensuing hydrochloric acid attacks and corrodes metal surfaces of equipment.

Polyolefinic packaging materials have been developed for soft shrink end-use. An example is the polyolefinic film supplied commercially by Cryovac, Inc. under the designation D-940™. This film provides a commercially useful alternative to PVC film, without the disadvantages of a chlorine-containing material. However, it would be desirable to provide a chlorine-free film that avoids the disadvantages of PVC film, but offers higher modulus and better elastic recovery than that now available from D-940, while maintaining good heat seal quality, high free shrink and a low shrink tension. Additionally, it would be advantageous to provide such attributes in a chlorine-free film having better optical quality (low haze) than is found in several present low shrink force chlorine-free films.

SUMMARY OF THE INVENTION

In a first aspect, a multilayer solid state oriented heat shrinkable film comprises a core layer comprising a linear random alpha-olefin/vinyl aromatic copolymer; and a first and second outer layer each comprising an olefinic polymer; wherein the film has a Young's modulus of between 50,000 and 200,000 pounds per square inch in at least one of the longitudinal and transverse directions; a free shrink of between 40% and 80% at 240° F. in at least one of the longitudinal and transverse directions; a shrink tension of between 50 and 400 pounds per square inch, or a shrink force of between 20 and 180 grams, at 240° F. in at least one of the longitudinal and transverse directions; and a haze of less than 6.

In a second aspect, a multilayer solid state oriented heat shrinkable film comprises a core layer comprising a linear random alpha-olefin/vinyl aromatic copolymer; a first and second intermediate layer each comprising an ethylene copolymer having a melt index less than 2.0; and a first and second outer layer each comprising an olefinic polymer; wherein the film has a Young's modulus of between 50,000 and 200,000 pounds per square inch in at least one of the longitudinal and transverse directions; a free shrink of between 40% and 80% at 240° F. in at least one of the longitudinal and transverse directions; a shrink tension of between 50 and 400 pounds per square inch, or a shrink force of between 20 and 180 grams, at 240° F. in at least one of the longitudinal and transverse directions; and a haze of less than 6.

In a third aspect, a multilayer oriented heat shrinkable film comprises a core layer comprising an ethylene copolymer having a melt index less than 2.0; a first and second intermediate layer each comprising a linear random alpha-olefin/vinyl aromatic copolymer; and a first and second outer layer each comprising an olefinic polymer; wherein the film has a Young's modulus of between 50,000 and 200,000 pounds per square inch in at least one of the longitudinal and transverse directions; a free shrink of between 40% and 80% at 240° F. in at least one of the longitudinal direction and transverse direction; a shrink tension of between 50 and 400 pounds per square inch, or a shrink force of between 20 and 180 grams, at 240° F. in at least one of the longitudinal and transverse directions; and a haze of less than 6.

In a fourth aspect, a method of making a film comprises extruding a sheet of film comprising a core layer comprising a linear random alpha-olefin/vinyl aromatic copolymer; and a first and second outer layer each comprising an olefinic polymer; quenching the extruded sheet of film; reheating the quenched sheet of film to its orientation temperature; and orienting the reheated sheet of film to produce a heat shrinkable film, the film having a Young's modulus of between 50,000 and 200,000 pounds per square inch in at least one of the longitudinal and transverse directions; a free shrink of between 40% and 80% at 240° F. in at least one of the longitudinal and transverse directions; a shrink tension of between 50 and 400 pounds per square, inch, or a shrink force of between 20 and 180 grams, at 240° F. in at least one of the longitudinal and transverse directions; and a haze of less than 6.

In a fifth aspect, a method of making a film comprises extruding a sheet of film comprising a core layer comprising a linear random alpha-olefin/vinyl aromatic copolymer; a first and second intermediate layer each comprising an ethylene copolymer having a melt index less than 2.0; and a first and second outer layer each comprising an olefinic polymer; quenching the extruded sheet of film; reheating the quenched sheet of film to its orientation temperature; and orienting the reheated sheet of film to produce a heat shrinkable film, the film having a Young's modulus of between 50,000 and 200,000 pounds per square inch in at least one of the longitudinal and transverse directions; a free shrink of between 40% and 80% at 240° F. in at least one of the longitudinal and transverse directions; a shrink tension of between 50 and 400 pounds per square inch, or a shrink force of between 20 and 180 grams, at 240° F. in at least one of the longitudinal and transverse directions; and a haze of less than 6.

In a sixth aspect, a method of making a film comprising extruding a sheet of film comprising a core layer comprising an ethylene copolymer having a melt index less than 2.0; a first and second intermediate layer each comprising a linear random alpha-olefin/vinyl aromatic copolymer; and a first and second outer layer each comprising an olefinic polymer; quenching the extruded sheet of film; reheating the quenched sheet of film to its orientation temperature; and orienting the reheated sheet of film to produce a heat shrinkable film, the film having a Young's modulus of between 50,000 and 200,000 pounds per square inch in at least one of the longitudinal and transverse directions; a free shrink of between 40% and 80% at 240° F. in at least one of the longitudinal and transverse directions; a shrink tension of between 50 and 400 pounds per square inch, or a shrink force of between 20 and 180 grams, at 240° F. in at least one of the longitudinal and transverse directions; and a haze of less than 6.

In any of the above-disclosed methods, the quenched extruded sheet of film can optionally be irradiated before the reheating step.

The reheated sheet of film can be oriented by e.g. trapped bubble orientation or tenter frame orientation.

Definitions

"Alpha-olefin" herein refers to olefinic compounds, whether unsubstituted or substituted, in which the first two carbon atoms in the chain have a double bond therebetween. Examples include ethylene, propylene, hexene, and octene.

"Alpha-olefin/vinyl aromatic copolymer" (AO/VA) herein refers to homogeneous copolymers made from an alpha-olefinic monomer having from two to eight carbon atoms per molecule, and a vinyl aromatic monomer. An example is ethylene/styrene copolymer. The alpha-olefin/vinyl aromatic copolymer herein is a random linear copolymer and includes a pseudo-random copolymer. Although the present description primarily focuses on olefin/vinyl aromatic copolymers, terpolymers are also within the scope of such term. Terpolymers include ethylene/octene/styrene, ethylene/styrene/butene, propylene/styrene/ethylene, and ethylene/styrene/hexene terpolymers. Olefin/vinyl aromatic copolymers typically are prepared using single-site catalysts, especially using metallocene catalysts. Techniques for manufacturing AO/VA materials such as ethylene/styrene copolymer are disclosed in U.S. Pat. No. 5,658,625 (Bradfute et al.) and U.S. Pat. No. 5,703,187 (Timmers), all incorporated herein by reference in their entirety.

"Core layer" herein refers to an internal layer of a multilayer film, i.e. a layer bounded on both of its major surfaces by another layer or layers; in a film with an odd number of total layers, the core layer is typically the central layer of the film.

"Comp. Ex.", herein refers to "Comparative Example". "Ex." herein refers to an example of the invention.

"Ethylene/alpha-olefin copolymer" (EAO) herein refers to a copolymer of ethylene with one or more aliphatic comonomers selected from $C_3$ to $C_{10}$ alpha-olefins such as propene, butene-1, hexene-1, octene-1, etc. in which the molecules of the copolymers assemble as long polymer chains with relatively few short chain branches arising from the alpha-olefin which was reacted with ethylene. This molecular structure is to be contrasted with conventional high pressure low density (LDPE) or medium density polyethylenes which are highly branched homopolymers and contain both long chain and short chain branches. EAO includes such heterogeneous materials as linear medium density polyethylene (LMDPE), linear low density polyethylene (LLDPE), and very low and ultra low density polyethylene (VLDPE and ULDPE), such as DOWLEX™ or ATTANE™ resins supplied by Dow, and ESCORENE™ resins supplied by Exxon.

"Free Shrink" values herein are in accordance with ASTM D 2732.

"Haze" values herein are in accordance with ASTM D 1003.

"Homogeneous ethylene/alpha olefin copolymer" (HEAO) herein refers polymerization reaction products of narrow molecular weight distribution ($M_w/M_n$ less than 3) and narrow composition distribution, referred to as to single-site polymerized polymers. These include linear homogeneous ethylene/alpha olefin copolymers (linHEAO) such as TAFMER™ resins supplied by Mitsui Petrochemical Corporation, EXACT™ resins supplied by Exxon, as well as long chain branched (lcbHEAO) AFFINITY™ resins supplied by the Dow Chemical Company, or ENGAGE™ resins supplied by DuPont Dow Elastomers. Homogeneous EAO copolymers may be polymerized using vanadium catalysts, as in the case of the TAFMER™ products, or may employ a metallocene catalyst as in the case of the more recent EXACT™ or AFFINITY™ products.

"Heterogeneous" polymers herein refers to polymerization reaction products of relatively broad molecular weight and relatively wide composition distribution, such as VLDPE, LLDPE.

"High density polyethylene" (HDPE) herein refers to a polyethylene having a density of between 0.94 and 0.965 grams per cubic centimeter.

"Intermediate" herein refers to a layer of a multi-layer film which is between an outer layer and a core layer of the film.

"Interpolymer" herein refers to polymers assembled using two or more different monomers, and includes copolymers, terpolymers, tetrapolymers, etc. (for example ethylene/styrene interpolymer) The term may be used alternatively with the synonym "copolymer".

"Lamination", "laminated sheet", and the like refer herein to the process, and resulting product, made by bonding together two or more layers of film or other materials. Lamination can be accomplished by joining layers with adhesives, joining with heat and pressure, and even spread coating and extrusion coating. The term laminate as used herein is also inclusive of coextruded multilayer films comprising one or more tie layers.

"L" and "LD" herein refer to the longitudinal direction, i.e. the direction of the film parallel to the path of extrusion. "T" and "TD" herein refer to the transverse direction, i.e. the direction of the film transverse to the path of extrusion.

"Linear low density polyethylene" (LLDPE) herein refers to polyethylene having a density between 0.916 and 0.925 grams per cubic centimeter.

"Linear medium density polyethylene" (LMDPE) herein refers to polyethylene having a density between 0.926 and 0.939 grams per cubic centimeter.

"Melt index" herein is with reference to ASTM D 1238-90, Condition 190/2.16.

"Melt-state oriented" herein refers to films obtained by extruding polymer resins and immediately stretching the film, especially as a tube, then cooling with air to form the final film product. Most notable are the "blown films" wherein forced air is applied to the inner volume of a tube of emerging extrudate to stretch while in the molten state. Melt-state oriented blown films do not exhibit significant shrink until heated to a temperature approaching the melting point of at least one of the resins.

"Multicomponent ethylene/alpha-olefin interpenetrating network resin" or "IPN resin" herein refers to multicomponent molecular mixtures of polymer chains which are interlaced at a molecular level and are thus true solid state solutions. These become new compositions exhibiting properties distinct from parent constituents. IPN resins provide phase co-continuity leading to enhancement of physical properties, and may exhibit bimodal or multimodal curves when analyzed using TREF or CRYSTAF. "IPN resins" includes semi-interpenetrating networks including crosslinked and uncrosslinked multicomponent molecular mixtures having a low density fraction and a high density fraction. Examples of IPN resins include ELITE™ resins from Dow.

"Outer layer" herein refers to what is typically an outermost, usually surface layer or skin layer of a multi-layer film, although additional layers, coatings, and/or films can be adhered to it.

"Polymer" herein refers to homopolymer, copolymer, terpolymer, etc. "Copolymer" herein includes copolymer, terpolymer, etc.

"Shrink Tension" and "Shrink Force" herein refer to a force exerted by a one inch strip of film as a result of heat shrinking at a specified temperature. Testing is conducted except as specified, according to ASTM 2838. A 2.8 inch by 1 inch test strip (2.8 inches is the distance between the jaws of the strain gauge) is immersed in an oil bath (Dow Corning 200 silicone oil, 20 centistroke) preheated to 100° F. [38° C.] which is thereafter heated at a rate of approximately 10° F. per minute to about 300° F., or to the melting point of the specimen, while restraining the immersed specimen in the jaws of a strain gauge. Strain force is measured continuously and reported at 10° increments and converted to psi by use of the initial thickness of the one-inch test strip.

"Solid state oriented" herein refers to films obtained by either co-extrusion or extrusion coating of the resins of different layers to obtain a primary thick sheet or tube (primary tape) that is quickly cooled to a solid state to quench (stop or slow) crystallization of the polymers, thereby providing a solid primary film sheet. The primary sheet is then reheated to the so-called orientation temperature, and thereafter biaxially stretched at the orientation temperature using either a tubular solid-state orientation process (for example a trapped bubble method) or using a flat solid-state orientation process (for example a simultaneous or sequential tenter frame), and finally rapidly cooled below the orientation temperature to provide a heat shrinkable film. In the trapped bubble solid state orientation process, the primary tape is stretched in the transverse direction (TD) by passing over an air bubble which is held between two rotating nip rolls, as well as stretched in the longitudinal direction (LD) by the differential speed between the two sets of nip rolls that contain the bubble. In the tenter frame process, the sheet or primary tape is stretched in the longitudinal direction by accelerating the sheet forward, while simultaneously or sequentially accelerating the sheet in the transverse direction by guiding the heat softened sheet through a diverging geometry frame. This tenter process typically refers to a flat sheet of relatively thick film. Solid state oriented films exhibit high free shrink when reheated to their orientation temperature.

"Styrenic Rubber" herein refers to thermoplastic rubbers based on styrene block copolymers in which for example anionic chemistry is employed to render long sequences ("blocks") of styrene monomer alternating with long sequences of mono-olefinic and diolefinic monomers. Examples of such rubbers include styrene-butadiene-styrene block interpolymer (SBS), styrene-ethylene-butene-styrene block interpolymer (SEBS), and styrene-isoprene-styrene interpolymer (SIS). Such elastomers are typically star shaped, dendritic or linear, depending on the type of initiator. Examples of thermoplastic rubber resins include KRATON™, K-RESIN™, VECTOR™ and STYROLUX™.

"Syndiotactic polystyrene" herein refers to crystalline syndio-specific styrene polymers. Homopolymers are high melting resins having melting points in the range of about 270° C. Such resins are sold by Dow Chemical Co. as QUESTRA™ or from Idemitsu as XAREC®. Copolymers exhibit somewhat lower melting points.

"Vinyl aromatic" herein includes e.g. styrene, p-methyl styrene, vinyl toluene, vinyl xylene, vinyl naphthalene, and vinyl anthracene, with or without one or more substituents (for hydrogens) present on the aromatic ring(s), and/or the olefin carbon connected to the aromatic ring.

"Young's modulus" or "modulus" values herein are in accordance with ASTM D 882.

All compositional percentages, including monomer percentages, used herein are presented on a "by weight" basis, unless designated otherwise. All film and sheet thicknesses designated in percentages are by percentage of total thickness of the film or sheet.

BRIEF DESCRIPTION OF THE DRAWINGS

A detailed description of embodiments of the invention follows, with reference to the attached drawings, wherein.

DETAILED DESCRIPTION OF THE INVENTION

Films of the invention can be made by any suitable process, such as extrusion, coextrusion, lamination, or extrusion coating, however, coextrusion is preferred. Following extrusion, the film is cooled to a solid state by, for example, cascading water, chilled water bath, chilled metal roller, or chilled air quenching. For some structures a precursor film layer or layers may be formed by extrusion with additional layers thereafter being extrusion coated thereon to form multilayer films. Multilayer tubes may also be formed with one of the tubes thereafter being coated or extrusion laminated onto the other.

Films of the invention are preferably subjected to an energetic radiation treatment, including, but not limited to corona discharge, plasma, flame, ultraviolet, and high energy electron treatment. Irradiation with ultraviolet or high energy electron treatment may be carried out in such a manner as to produce a crosslinked polymer network. Irradiation can be performed prior to or after any orientation step. Electronic radiation dosages, by e.g. electron beam irradiation, can be between 10 and 200 kiloGray, such as between 15 and 150, 20 and 150, or 20 and 100 kiloGray. Alternatively, crosslinking can be accomplished by chemical means.

The AO/VA can comprise 100% of the layer in which it is present, or it may be present in a blend with another thermoplastic homopolymer or copolymer, or in films having additional layers. However, in the case of blends, the other polymer must be selected to be compatible with AO/VA so as to maintain the requisite mechanical and especially optical qualities of the inventive films. Especially suitable for blending are polystyrene, syndiotactic polystyrene, and thermoplastic styrenic rubbers.

Films of the invention useful in providing low shrink tension or low shrink force are typically three or more layers with the AO/VA placed in the core and/or intermediate positions. The AO/VA can comprise at least 40%, such as at least 50%, or at least 60%, of the film thickness. The AO/VA can comprise between 30% and 80%, such as between 40% and 70%, between 45% and 65%, or between 50 and 60%, of the film thickness.

Figure 1:
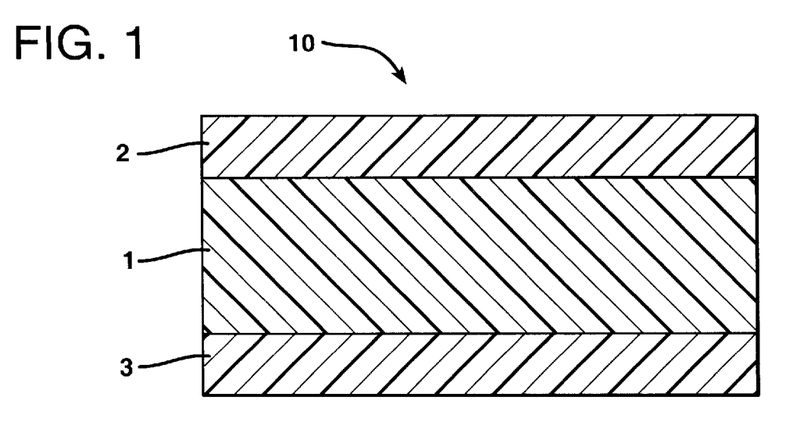
FIG. 1 is a cross-sectional view of a three layer film.

Referring to FIG. 1, a film 10 comprises a core layer 1, a first outer layer 2, and a second outer layer 3. Outer layers 2 and 3 can be surface or skin layers.

Core layer 1 comprises an AO/VA. Core layer 1 comprises in one embodiment at least 40%, such as at least 50%, of the total thickness of film 10. Core layer 1 preferably comprises between 40% and 70%, such as between 42% and 68%, or between 45% and 60%, of the film thickness. The AO/VA can comprise e.g. ethylene/styrene copolymer, ethylene/substituted styrene copolymer, ethylene/toluene copolymer, ethylene/vinyl naphthalene copolymer, or ethylene/vinyl anthracene copolymer. The AO/VA preferably has a density of between 0.9 and 1.2 g/cm$^3$, such as between 0.910 and 1.15 g/cm$^3$, between 0.940 and 1.10 g/cm$^3$, or between 0.950 and 1.05 g/cm$^3$. The AO/VA preferably has a melt index of between 0.05 and 2.0, such as between 0.1 and 1.5, between 0.2 and 1.0, or between 0.25 and 0.5. Preferred AO/VA has a melt index less than 1.5, such as less than 1.0, less than 0.7, and more preferably has a melt index of about 0.5. A preferred AO/VA is ethylene/styrene copolymer, such as linear homogeneous ethylene/styrene random copolymer. Such linear homogeneous ethylene/styrene random copolymer products may be obtained from Dow Chemical. Dow has characterized its ethylene/styrene random copolymers as "pseudo-random" copolymers, due to their apparent lack of any sequences of styrene monomer within the copolymer structure. Such materials may be contrasted with block interpolymers. The ethylene/styrene copolymer preferably comprises between 61 and 85%, such as between about 65 and 80%, or between 70 and 78%, by weight of the copolymer, of styrene. The ethylene/styrene copolymer preferably comprises more than 60%, such as more than 62%, more than 65%, or more than 70%, by weight of the copolymer, of styrene.

First and second outer layers 2 and 3 each comprise an olefinic polymer such as ethylene/alpha olefin copolymer, homogeneous ethylene/alpha olefin copolymer, ethylene/vinyl acetate copolymer, ethylene/alkyl acrylate copolymer, ethylene/acrylic acid copolymer, ionomer, propylene homopolymer and copolymer, butylene polymer and copolymer, multi-component ethylene/alpha-olefin interpenetrating network resin, a blend of a propylene homopolymer and a propylene/ethylene copolymer, high density polyethylene, a blend of high density polyethylene and ethylene/vinyl acetate copolymer, a blend of high density polyethylene and low density polyethylene; or a blend of any of these materials. The ethylene/alpha-olefin copolymer can have a density of between 0.86 and 0.96, such as between 0.89 and 0.94, between 0.90 and 0.93, or between 0.900 and 0.915 grams/cubic centimeter. Outer layers 2 and 3 can be identical, or can differ from each other in composition (such as the difference created by the presence or amount of a blend of two or more resins), one or more physical properties, amount or type of additives, degree of crosslinking, thickness, or the like. For example, layer 2 can comprise a blend of a propylene homopolymer and a propylene/ethylene copolymer, while layer 3 can comprise a propylene/ethylene copolymer. As another example, layer 2 can comprise a propylene/ethylene copolymer, while layer 3 can comprise an ethylene/alpha-olefin copolymer. Outer layers 2 and 3 can, in one embodiment, each comprise between 15% and 25% of the total thickness of film 10.

Film structures in accordance with the invention can thus be depicted as A/B/A or as A/B/C, where A, B, and C each represent a distinct layer of a multilayer film.

In an alternative embodiment (see FIG. 2), a film 20 comprises a core layer 11, first outer layer 12, second outer layer 13, first intermediate layer 14, and second intermediate layer 15.

Figure 2:
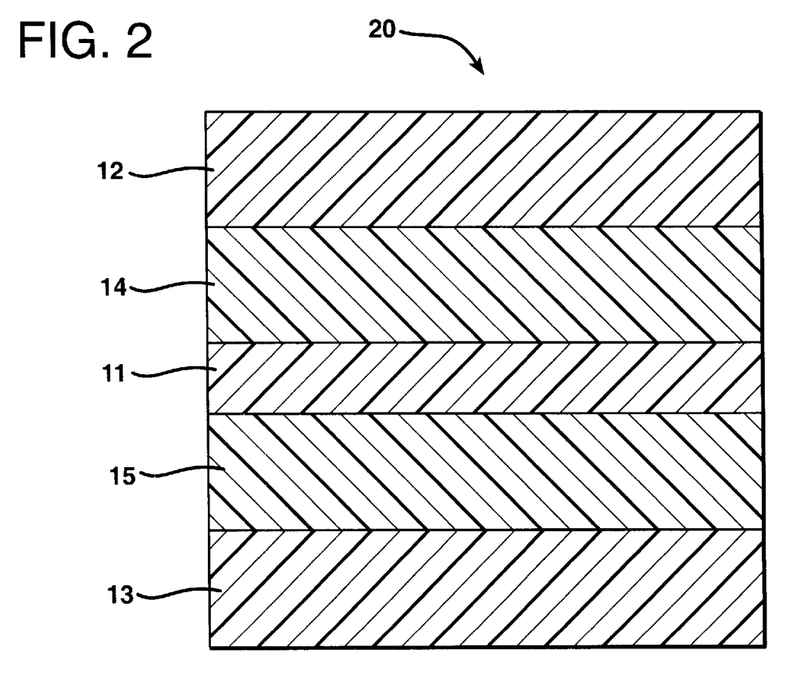
FIG. 2 is a cross-sectional view of a five layer film.

The core layer 11, and outer layers 12 and 13, can comprise any of the materials disclosed above for layers 1, 2 and 3 respectively of FIG. 1.

Intermediate layers 14 and 15 each comprise an ethylene copolymer having a melt index less than 2.0, such as ethylene/alpha-olefin copolymer having a density of less than 0.916 grams/cubic centimeter, ethylene/vinyl acetate copolymer, ethylene/propylene/diene terpolymer, very low density polyethylene, a blend of very low density polyethylene and ethylene/vinyl acetate copolymer, a blend of very low density polyethylene and linear low density polyethylene, and multicomponent ethylene/alpha-olefin interpenetrating network resin.

In one embodiment, the core layer 11 comprises between 40% and 60%, such as between 42% and 58%, or between 45% and 55%, of the total thickness of film 20; outer layers 2 and 3 each comprise between 5% and 10% of the total thickness of film 20; and intermediate layers 14 and 15 each comprise between 10% and 25%, such as between 15% and 20%, of the total thickness of film 20.

In a second alternative embodiment (see FIG. 2), a film 20 comprises a core layer 11, first outer layer 12, second outer layer 13, first intermediate layer 14, and second intermediate layer 15. The core layer 11 can comprise any of the materials disclosed above for layers 14 and 15 of the first embodiment of FIG. 2. Thus, core layer 11 of this second alternative embodiment can comprise an ethylene copolymer having a melt index less than 2.0. Outer layers 12 and 13 can comprise any of the materials disclosed for layers 2 and 3 respectively of FIG. 1, and for layers 12 and 13 of the first alternative embodiment of FIG. 2. Thus, core layer 11 of this second alternative embodiment can comprise an olefinic polymer. Intermediate layers 14 and 15 can comprise any of the materials disclosed for layer 1 of FIG. 1, and for layer 11 of the first alternative embodiment of FIG. 2. Thus, intermediate layers 14 and 15 of this second alternative embodiment can comprise an AO/VA. In one embodiment, the core layer 11 comprises between 20% and 50%, such as between 30% and 40%, of the total thickness of film 20; outer layers 12 and 13 each comprise between 5% and 10% of the total thickness of film 20; and intermediate layers 14 and 15 each comprise between 20% and 35%, such as between 24% and 30%, of the total thickness of film 20.

Figure 3:
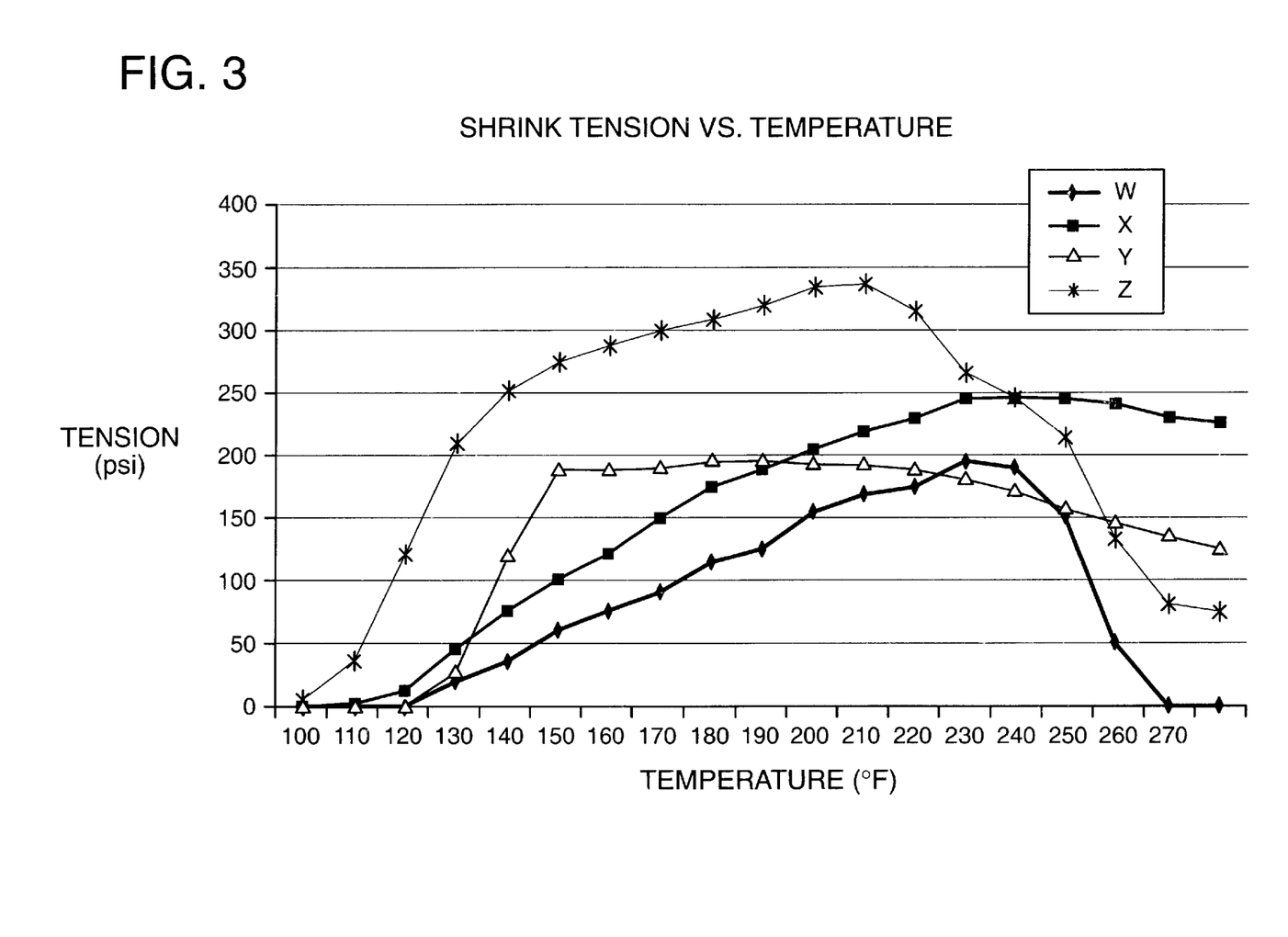
FIG. 3 is a graph showing films of the invention, and comparative films, with respect to shrink tension and temperature.

FIG. 3 illustrates how the shrink properties of multilayer films of the invention, having both AO/VA and propylene homopolymer or copolymer, maintain a low shrink force at elevated temperatures in a manner similar to PVC shrink films. The shrink properties of films of the invention having polyethylene and AO/VA behave at elevated temperatures more like prior art polyethylene films but exhibit much higher modulus than available from polyethylene films. In those applications benefiting from higher use temperatures, a film having a propylene-based component may be preferred. In FIG. 3, "W" represents a film having AO/VA and including an ethylenic component; "X" represents a film having AO/VA and including a propylenic component; ; "Y" represents a current commercial PVC film, REYNOLON™5044; and "Z" represents a current commercial ethylene-based film, D940™.

Table 1 identifies the materials used in the examples and comparative examples. The remaining tables describe the formulations and/or properties of films made with these materials.

TABLE 1

| Material Code | Tradename or Designation | Source(s) |
|---|---|---|
| A1 | ESCORENE ™ PD-9302 E1 | Exxon |
| A2 | ATTANE ™ 4203 | Dow |
| A3 | — | Dow |

TABLE 1-continued

| Material Code | Tradename or Designation | Source(s) |
|---|---|---|
| A4 | — | Dow |
| A5 | ESCORENE ™ PD-4062. E7 | Exxon |
| A6 | — | Dow |
| A7 | XU 61509.32 | Dow |
| A8 | PE 5269T | Chevron |
| A9 | PE 1651CS28 | Huntsman |
| A10 | ELVAX ™ PE3507-2 | DuPont |
| A11 | ESCORENE ™ LD-705.16 | Exxon |
| A12 | ELVAX ™ 3130GC | DuPont |
| A13 | PE 1335 | Huntsman |
| A14 | ESCORENE ™ LD-134.09 | Exxon |
| A15 | PETROTHENE ™ LY 660000 | Equistar |
| A16 | FORTIFLEX ™ J60-500C-147 | Solvay |
| A17 | — | Dow |
| A18 | BUNA EP-T-2370-P | Bayer |
| A19 | SF 18-350 SILICONE | General Electric |
| A20 | DOWLEX ™ 2045.03 | Dow |
| A21 | AFFINITY ™ SL 1170 | Dow |
| A22 | SP1903 ™ | Eastman |
| A23 | DOWLEX ™ 2045.04 | Dow |
| A24 | DOWLEX ™ 2035 | Dow |
| A25 | Duraflex 300 | Basell |
| A26 | DOWLEX ™ 2037 | Dow |
| A27 | — | Dow |
| A28 | — | Dow |
| A29 | — | Dow |
| A30 | — | Dow |
| A31 | — | Dow |
| A32 | ESCORENE ™ PP-9122 | Exxon |
| A33 | ESCORENE ™ 200.48 | Exxon |
| A34 | VISTALON ™ 7800 | Exxon |
| A35 | QUESTRA ™ MA405 | Dow |
| A36 | QUESTRA ™ MA406 | Dow |
| A37 | STYRON ™ 685D | Dow |
| A38 | AMPACET ™ 10926 | Ampacet |
| A39 | PE1042CS15 ™ | Huntsman |
| A40 | AFFINITY ™ PF 1202 | Dow |
| A41 | KEMAMIDE ™ E | Witco |
| A42 | INSPIRE ™ 112 | Dow |
| A43 | AFFINITY ™ PL 1880 | Dow |
| A44 | PROFAX ™ SR-549M | Basell |
| A45 | AFFINITY ™ PF 1140 | Dow |
| A46 | PROFAX ™ SRS 4917 | Basell |

A1 is an propylene/ethylene copolymer with an ethylene content of 3.3 mole % of the copolymer, and a melt index of 3.1 to 3.9.

A2 is an ethylene/1-octene copolymer with a density of 0.905 grams/cc, a melt index of 0.80, and a 1-octene content of 11.5% of the copolymer.

A3 is an ethylene/styrene copolymer with a styrene content of 60% of the copolymer, and a melt index of about 0.5.

A4 is an ethylene/styrene copolymer with a styrene content of 75% of the copolymer, a density of 0.99 grams/cc, and a melt index of about 0.5.

A5 is a propylene homopolymer with a melt flow of about 3.6.

A6 is an ethylene/styrene copolymer with a styrene content of 78% of the copolymer, and a melt index of about 1.0.

A7 is an ethylene/1-octene copolymer with a density of 0.911 grams/cc, a melt index of 0.5, and a 1-octene content of 9% of the copolymer.

A8 is an ethylene/vinyl acetate copolymer with a density of 0.932 grams/cc, a melt index of 0.5, and a vinyl acetate content of 6.5% of the copolymer.

A9 is an ethylene/vinyl acetate copolymer with a density of 0.930 grams/cc, a melt index of 0.5, and a vinyl acetate content of 6.5% of the copolymer.

A10 is an ethylene/vinyl acetate copolymer with a density of 0.931 grams/cc, a melt index of 2.6, and a vinyl acetate content of 6.2% of the copolymer.

A11 is an ethylene/vinyl acetate copolymer with a density of 0.937 grams/cc, a melt index of 0.40, and a vinyl acetate content of 13.3% of the copolymer.

A12 is an ethylene/vinyl acetate copolymer with a density of 0.935 grams/cc, a melt index of 2.5, and a vinyl acetate content of 12% of the copolymer.

A13 is an ethylene/vinyl acetate copolymer with a density of 0.924 grams/cc, a melt index of 2.0, and a vinyl acetate content of 3.3% of the copolymer.

A14 is a low density polyethylene with a density of 0.920 grams/cc, and a melt index of 1.9.

A15 is a high density polyethylene with a density of 0.953 grams/cc, and a melt index of 5.4 to 7.7.

A16 is a high density polyethylene with a density of 0.960 grams/cc, and a melt index of 6.

A17 is an ethylene/styrene copolymer with a styrene content of 36% of the copolymer, and a melt index of about 1.6.

A18 is an ethylene/propylene/diene monomer terpolymer (EPDM) with a melt index of 2.0. The diene monomer, 5-ethylidene-2-norbornene, forms 3% of the terpolymer.

A19 is a polydimethylsiloxane.

A20 is an ethylene/1-octene copolymer with a density of 0.920 grams/cc, a melt index of 1.1, and a 1-octene content of 6.5% of the copolymer.

A21 is a single site catalyzed ethylene/1-octene copolymer with a density of 0.912 grams/cc, and a melt index of 1.5.

A22 is an ethylene//butyl acrylate copolymer with a density of 0.93 grams/cc, a melt index of 0.45, and a butyl acrylate content of 18% of the copolymer.

A23 is an ethylene/1-octene copolymer with a density of 0.920 grams/cc, a melt index of 1.0, and a 1-octene content of 6.5% of the copolymer.

A24 is an ethylene/1-octene copolymer with a density of 0.920 grams/cc, a melt index of 5.2 to 6.8, and a 1-octene content of 2.5% of the copolymer.

A25 is a polybutylene resin with a density of 0.915 g/cm3 and a melt index of 4.0.

A26 is an ethylene/1-octene copolymer with a density of 0.935 grams/cc, a melt index of 2.5, and a 1-octene content of 2.5% of the copolymer.

A27 is an ethylene/styrene copolymer with a styrene content of 69% of the copolymer, and a melt index of about 1.0.

A28 is an ethylene/styrene copolymer with a styrene content of 51% of the copolymer, and a melt index of about 3.8.

A29 is an ethylene/styrene copolymer with a styrene content of 69% of the copolymer, and a melt index of about 1.6.

A30 is an ethylene/styrene copolymer with a styrene content of 81% of the copolymer, and a melt index of about 0.9.

A31 is an ethylene/styrene copolymer with a styrene content of 70% of the copolymer, and a melt index of about 1.0.

A32 is an propylene/ethylene copolymer with an ethylene content of 2.1 mole % of the copolymer, and a melt index of 2.1.

A33 is a low density polyethylene with a density of 0.915 grams/cc, and a melt index of 7.5.

A34 is an ethylene/propylene/diene monomer terpolymer (EPDM) with a melt index of 1.5. The diene monomer is 5-ethylidene-2-norbornene, and it forms 6% of the terpolymer. A34 includes 2%, of the A34 resin, of high density polyethylene.

A35 is a syndiotactic styrene/p-methyl styrene copolymer.

A36 is a syndiotactic styrene/p-methyl styrene copolymer with a melt index of 4.

A37 is a polystyrene.

A38 is a blend of a low density polyethylene resin with slip and antiblock additives.

A39 is a low density polyethylene resin with a melt index of 2.0, and a density of 0.922 grams/cc.

A40 is a single site catalyzed ethylene/alpha-olefin copolymer.

A41 is an amide of erucic acid.

A42 is an impact resistant propylene-based resin with a melt flow of 0.4.

A43 is a single site catalyzed ethylene/alpha-olefin copolymer with a melt index of 1.0, and a density of 0.902 grams/cc.

A44 is a propylene/ethylene copolymer with a melt flow of 12.

A45 is a single site catalyzed ethylene/alpha-olefin copolymer with a melt index of 1.6, and a density of 0.895 grams/cc.

A46 is a propylene/ethylene copolymer.

EXAMPLES

The invention can be further understood by way of illustration by reference to the examples herein.

Comparative Example 1

A three layer (20/60/20 layer ratio) 7.5 mil coextruded sheet was produced by flat casting a palindromic three-layer extrudate onto a chilled polished roll. The outer layers were each a blend of 60% A26+40% A13; the core layer was A17. The sheet was irradiated to a level of 35 kiloGray, and then heated, using hot air at 124° C., to its orientation temperature. The irradiated and heated sheet was then oriented by tenter framing at an orientation ratio of 5:1 in each of the longitudinal and transverse directions, then immediately cooled.

Comparative Example 2

A three layer (20/60/20 layer ratio) 7.5 mil coextruded sheet was produced by flat casting a palindromic three-layer extrudate onto a chilled polished roll. The outer layers were each a blend of 60% A26+40% A13; the core layer was A28. The sheet was irradiated to a level of 35 kiloGray, and then heated, using hot air at 124° C., to its orientation temperature. The irradiated and heated sheet was then oriented by tenter framing at an orientation ratio of 5:1 in each of the longitudinal and transverse directions, then immediately cooled.

Comparative Example 3

A three layer (20/60/20 layer ratio) 7.5 mil coextruded sheet was produced by flat casting a palindromic three-layer extrudate onto a chilled polished roll. The outer layers were each a blend of 60% A26+40% A13; the core layer was a blend of 60% A26+40% A23. The sheet was irradiated to a level of 35 kiloGray, and then heated, using hot air at 124° C., to its orientation temperature. The irradiated and heated sheet was then oriented by tenter framing at an orientation ratio of 5:1 in each of the longitudinal and transverse directions, then immediately cooled.

As can be seen in Table 2, the shrink force is lowered with increasing styrene level in the copolymer resins used.

TABLE 2

| Film | Shrink Force @ 220° F. (grams) | Shrink Tension @ 22° F. (psi) | Wt % styrene in copolymer |
| --- | --- | --- | --- |
| Comp. Example 1 | 22.7 | 185 | 36 |
| Comp. Example 2 | 13.6 | 140 | 51 |
| Comp. Example 3 | 36.3 | 290 | 0 |

Comparative Example 4

A three layer (25/50/25 layer ratio) 18 mil laminate sheet was produced by flat casting individual layers and heat laminating the components. The outer layers were each A23 while the core layer was A17. The sheet was irradiated to a level of 35 kiloGray, and then heated, using hot air at 110° C., to its orientation temperature. The irradiated and heated sheet was then oriented by tenter framing at an orientation ratio of 4:1 in each of the longitudinal and transverse directions, then immediately cooled.

Comparative Example 5

A three layer (25/50/25 layer ratio) 18 mil laminate sheet was produced by flat casting individual layers and heat laminating the components. The outer layers were each A23 while the core layer was A28. The sheet was irradiated to a level of 35 kiloGray, and then heated, using hot air at 110° C., to its orientation temperature. The irradiated and heated sheet was then oriented by tenter framing at an orientation ratio of 4:1 in each of the longitudinal and transverse directions, then immediately cooled.

Example 1

A three layer (25/50/25 layer ratio) 18 mil laminate sheet was produced by flat casting individual layers and heat laminating the components. The outer layers were each A23 while the core layer was A29. The sheet was irradiated to a level of 35 kiloGray, and then heated, using hot air at 110° C., to its orientation temperature. The irradiated and heated sheet was then oriented by tenter framing at an orientation ratio of 4:1 in each of the longitudinal and transverse directions, then immediately cooled.

Example 2

A three layer (25/50/25 layer ratio) 18 mil laminate sheet was produced by flat casting individual layers and heat laminating the components. The outer layers were each A23 while the core layer was A30. The sheet was irradiated to a level of 35 kiloGray, and then heated, using hot air at 110° C., to its orientation temperature. The irradiated and heated sheet was then oriented by tenter framing at an orientation ratio of 4:1 in each of the longitudinal and transverse directions, then immediately cooled.

Comparative Example 6

A three layer (25/50/25 layer ratio) 18 mil laminate sheet was produced by flat casting individual layers and heat laminating the components. The outer layers were each a blend of 50% A23+25% A13+25% A24; the core layer was A23. The sheet was irradiated to a level of 35 kiloGray, and then heated, using hot air at 110° C., to its orientation temperature. The irradiated and heated sheet was then oriented by tenter framing at an orientation ratio of 4.8:1 in each of the longitudinal and transverse directions, then immediately cooled.

Table 3 indicates that the shrink tension (and consequently shrink force) may be lowered when using ethylene/styrene copolymer in multi-ply films. All films appeared cloudy and mottled. This set of examples is therefore less desirable for applications where high clarity or transparency is desired, but may useful where optical properties are not critical.

TABLE 3

| Film | Shrink Tension @ 220° F. (psi) | | Shrink Tension @ 240° F. (psi) | | Wt % styrene in copolymer |
|---|---|---|---|---|---|
| | L | T | L | T | |
| Comp. Ex. 6 | 408 | 398 | 435 | 440 | 0 |
| Comp. Example 4 | 292 | 332 | 283 | 301 | 36 |
| Comp. Example 5 | 272 | 326 | 330 | 358 | 51 |
| Example 1 | 285 | 300 | 279 | 302 | 69 |
| Example 2 | 273 | 288 | 311 | 321 | 81 |

Mono-layer films Comp. Ex. 7, Comp. Ex. 8, Comp. Ex. 9, and Comp. Ex. 10 were cast at 18 mil thickness using the same ethylene/styrene resins used in Examples 3, 4, 5, and 6 respectively. As in the previous three-ply testing the sheets were irradiated at an exposure level equivalent to 35 kGray. Attempts to biaxially orient the films were unsuccessful.

TABLE 4

| Film | Resin | Result |
|---|---|---|
| Comp. Ex. 7 | A17 | Would not stretch evenly to 4.8 × 4.8 |
| Comp. Ex. 8 | A28 | Holes developed during stretch |
| Comp. Ex. 9 | A29 | Film melted |
| Comp. Ex. 10 | A30 | Film disintegrated |

Comp.Example 11

A palindromic three layer (20/60/20 layer ratio) 12.5 mil laminate sheet was coextruded using four extruder drive delivering molten polymers into a flat die. Emerging extrudate was cooled to a solid state by contact with a rotating, water cooled, polished metal cylinder. The outer layers were each A23 while the core layer was A31. The sheet passed between a second water cooled polished metal roll and a rubber roll and wound as a roll of thick film. The sheet was irradiated to a level of 35 kiloGray, and then heated, using hot air at 95° C., to its orientation temperature. The irradiated and heated sheet was then oriented by tenter framing at an orientation ratio of 5:1 in each of the longitudinal and transverse directions, then immediately cooled by contact with liquid nitrogen. The film had an average Young's modulus of 47,000 psi.

Example 3

A palindromic three layer (20/60/20 layer ratio) 12.5 mil laminate sheet was coextruded using four extruder drive delivering molten polymers into a flat die. Emerging extrudate was cooled to a solid state by contact with a rotating, water cooled, polished metal cylinder. The sheet passed between a second water cooled polished metal roll and a rubber roll and wound as a roll of thick film. The sheet was heated, using hot air at 105° C., to its orientation temperature. The heated sheet was then oriented by tenter framing at an orientation ratio of 5:1 in each of the longitudinal and transverse directions, then immediately cooled by contact with liquid nitrogen. The outer layers were each A1; the core layer was A31. The film had an average Young's modulus of 53,000 psi.

Table 5 compares Comp. Example 11 and Example 3 to a commercial polyvinyl chloride film, REYNOLON™ 5044 from Reynolds (Comp. Ex. 12), and to a commercial polyethylene film, D 940™ (Comp. Ex. 13). Shrink tension is average of longitudinal direction and transverse direction values.

TABLE 5

| | Shrink Tension (psi) | | | |
|---|---|---|---|---|
| Temp. (° F.) | Comp. Ex. 11 | Ex. 3 | Comp. Ex. 12 | Comp. Ex. 13 |
| 100 | 0 | 0 | 0 | 35 |
| 110 | 0 | 12 | 0 | 120 |
| 120 | 20 | 45 | 28 | 209 |
| 130 | 35 | 75 | 120 | 251 |
| 140 | 60 | 100 | 189 | 273 |
| 150 | 75 | 120 | 189 | 286 |
| 160 | 90 | 150 | 192 | 298 |
| 170 | 115 | 175 | 195 | 308 |
| 180 | 125 | 190 | 197 | 319 |
| 190 | 155 | 205 | 196 | 334 |
| 200 | 170 | 220 | 194 | 337 |
| 210 | 175 | 230 | 189 | 315 |
| 220 | 196 | 245 | 182 | 265 |
| 230 | 190 | 247 | 171 | 246 |
| 240 | 150 | 245 | 158 | 215 |
| 250 | 50 | 240 | 146 | 132 |
| 260 | 0 | 230 | 135 | 79 |
| 270 | 0 | 225 | 125 | 72 |

Annular Coextruded Multiply Films

Three and five layer film structures were made to examine the effects of copolymer and layer ratio on shrink film properties. Five extruders were employed to deliver an annular extrudate which was downwardly cast and cooled to a solid state to provide an 18.75 mil thick cylindrical sheet. The cylindrical sheet was flattened into a doubled ribbon, or primary tape, conveyed through an irradiation chamber, conveyed to a reheating station where the tape was immediately heated using hot air, and then stretched in the transverse direction (TD) by passing over an air bubble which is held between two rotating nip rolls, while being simultaneously stretched in the longitudinal direction (LD) by the differential speed between the two sets of nip rolls that contain the bubble. The resulting 5:1×5:1 biaxially oriented heat shrinkable films were tested for physical properties, and the results are tabulated in Tables 6 and 7. In Table 6, numbers in parentheses for each layer indicate the layer thickness as a percentage of the overall film thickness (e.g. in Comp. Ex. 9, layer 1 and 5 each constituted 15% of the total film thickness).

A comparison of the film having the A3 resin with that having the A4 resin shows the unexpected effect of changing the styrene level upon the modulus of the shrink film. An increase of 15% in the styrene level of the selected copolymer resulted in a change in the tensile modulus by a factor of 5.

TABLE 6

| Example | Layer 1 (%) | Layer 2 (%) | Layer 3 (%) | Layer 4 (%) | Layer 5 (%) | Free Shrink (%) @ 240° F. | Shrink Tension (psi) @ 240° F. | Tensile Modulus (psi × 1000) |
|---|---|---|---|---|---|---|---|---|
| Comp. Ex. 14 | A1 + A5 (15) | A3 (10) | A3 (50) | A3 (10) | A1 + A5 (15) | 30 | 104 | 32 |
| Comp. Ex. 11 5 | A23 + A24 (15) | A3 (10) | A3 (50) | A3 (10) | A23 + A24 (15) | 65 | 137 | 5.2 |
| Comp. Ex. 16 | A23 + A24 (15) | A27 + A39 (10) | A27 + A39 (50) | A27 + A39 (10) | A23 + A24 (15) | 67 | 280 | 37.2 |
| Comp. Ex. 17 | A1 + A5 (15) | A20 (10) | A20 (50) | A20 (10) | A1 + A5 (15) | 34 | 130 | 41.0 |
| Comp. Ex. 18 | A1 + A5 (5) | A2 (20) | A3 (50) | A2 (20) | A1 + A5 (5) | 60 | 204 | 20.5 |
| Ex. 4 | A1 + A5 (5) | A2 (25) | A4 (40) | A2 (25) | A1 + A5 (5) | 68 | 260 | 105 |

1. The A23 + A24 blend is a blend of about 83% A23, about 15% A24, and about 2% of slip and antiblock agents, all percents of the overall blend composition.
2. Comparative examples 14 through 17 are three layer films, but were manufactured such that layers 2, 3, and 4 were simultaneously combined (to build up film thickness). Since each layer is made up of identical material, the three layers are expressed as one layer in the final film.

TABLE 7

| Example | | Modulus × 10³ | Tension @ 220° F. | Tension @ 240° F. | Tension @ 260° F. | Tension @ 280° F. | Shrink @ 240° F. | Shrink @ 260° F. | Shrink @ 280° F. | Haze | Film layer construction | Layer ratios and Gauge |
|---|---|---|---|---|---|---|---|---|---|---|---|---|
| Comp Ex. 19 | L | 146 | | 173 | 178 | 187 | 35 | 36 | 38 | 3.8 | (Mono-ply PVC) | 1.5 mils |
| | T | 136 | | 168 | 168 | 157 | 33 | 37 | 38 | | | |
| Comp Ex. 20 | L | 21 | | 221 | 215 | 216 | 64 | 70 | 75 | 1.9 | A1 + A5 | 5% |
| | T | 18 | | 187 | 177 | 172 | 55 | 63 | 68 | | A2 | 20% |
| | | | | | | | | | | | A3 | 50% |
| | | | | | | | | | | | A2 | 20% |
| | | | | | | | | | | | A1 + A5 | 5% |
| | | | | | | | | | | | Total Gauge | 0.70 |
| Ex. 5 | L | 111 | 346 | 258 | 198 | 410 | 69 | 73 | 76 | 1.6 | A1 + A5 | 5% |
| | T | 107 | 330 | 195 | 161 | 334 | 68 | 71 | 76 | | A2 | 25% |
| | | | | | | | | | | | A4 | 40% |
| | | | | | | | | | | | A2 | 25% |
| | | | | | | | | | | | A1 + A5 | 5% |
| | | | | | | | | | | | Total Gauge | 0.75 |
| Ex. 6 | L | 132 | 354 | 261 | 202 | 389 | 66 | 73 | 76 | 1.8 | A1 + A5 | 5% |
| | T | 108 | 316 | 157 | 132 | 315 | 65 | 69 | 74 | | A2 | 20% |
| | | | | | | | | | | | A4 | 50% |
| | | | | | | | | | | | A2 | 20% |
| | | | | | | | | | | | A1 + A5 | 5% |
| | | | | | | | | | | | Total Gauge | 0.75 |
| Ex. 7 | L | 151 | 297 | 200 | 158 | 356 | 68 | 73 | 77 | 1.8 | A1 + A5 | 5% |
| | T | 129 | 286 | 150 | 127 | 276 | 65 | 68 | 71 | | A2 | 15% |
| | | | | | | | | | | | A4 | 60% |
| | | | | | | | | | | | A2 | 15% |
| | | | | | | | | | | | A1 + A5 | 5% |
| | | | | | | | | | | | Total Gauge | 0.75 |
| Ex. 8 | L | 122 | 319 | 280 | 215 | 366 | 65 | 71 | 76 | 2.1 | A1 + A5 | 5% |
| | T | 84 | 272 | 185 | 154 | 275 | 65 | 69 | 73 | | A2 | 25% |
| | | | | | | | | | | | A6 | 40% |
| | | | | | | | | | | | A2 | 25% |
| | | | | | | | | | | | A1 + A5 | 5% |
| | | | | | | | | | | | Total Gauge | 0.75 |
| Ex. 9 | L | 116 | 310 | 182 | 152 | 364 | 52 | 68 | 74 | 2.7 | A1 + A5 | 10% |
| | T | 104 | 309 | 252 | 209 | 297 | 53 | 60 | 70 | | A2 | 15% |
| | | | | | | | | | | | A6 | 50% |
| | | | | | | | | | | | A2 | 15% |
| | | | | | | | | | | | A1 + A5 | 10% |
| | | | | | | | | | | | Total Gauge | 0.75 |
| Ex. 10 | L | 131 | 300 | 228 | 176 | 344 | 63 | 70 | 75 | 2.3 | A1 + A5 | 5% |
| | T | 109 | 279 | 154 | 132 | 259 | 59 | 65 | 71 | | A2 | 20% |
| | | | | | | | | | | | A6 | 50% |
| | | | | | | | | | | | A2 | 20% |
| | | | | | | | | | | | A1 + A5 | 5% |
| | | | | | | | | | | | Total Gauge | 0.75 |

TABLE 7-continued

| | | Modulus × 10³ | Tension @ 220° F. | Tension @ 240° F. | Tension @ 260° F. | Tension @ 280° F. | Shrink @ 240° F. | Shrink @ 260° F. | Shrink @ 280° F. | Haze | Film layer construction | Layer ratios and Gauge |
|---|---|---|---|---|---|---|---|---|---|---|---|---|
| Ex. 11 | L | 137 | 444 | 228 | 176 | 403 | 63 | 70 | 76 | 3.3 | A1 + A5 | 5% |
| | T | 121 | 289 | 154 | 132 | 271 | 59 | 65 | 71 | | A2 | 20% |
| | | | | | | | | | | | A6 + A37 | 50% |
| | | | | | | | | | | | A2 | 20% |
| | | | | | | | | | | | A1 + A5 | 5% |
| | | | | | | | | | | | Total Gauge | 0.75 |
| Comp Ex. 21 | L | 25 | | 258 | 274 | 235 | 73 | 79 | 80 | 4.1 | A23 + A24 | 20% |
| | T | 29 | | 281 | 293 | 239 | 72 | 77 | 76 | | A11 + A22 | 60% |
| | | | | | | | | | | | A23 + A24 | 20% |
| | | | | | | | | | | | Total gauge | 0.75 |
| Comp Ex. 22 | L | 115 | | 399 | 439 | 431 | 39 | 48 | 70 | 1.8 | A1 + A5 | 25% |
| | T | 123 | | 574 | 600 | 498 | 52 | 57 | 69 | | A20 | 50% |
| | | | | | | | | | | | A1 + A5 | 25% |
| | | | | | | | | | | | Total gauge | 0.75 |

Notes to Table 7:
1) Each example and comparative example was solid stated oriented at an orientation ratio of 5:1 in each of the longitudinal and transverse directions. The final film thickness (gauge) was targeted at 0.75 mil.
2) "mil" = 0.001 inches.
3) The A1 + A5 blend is a blend of 87.5% A1, and 12.5 % A5, both percents of the overall blend composition; wherein A5 itself includes about 10%, of A5, of slip and antiblock agents.
4) The A11 + A22 blend is a blend of about 73% A11, about 25% A22, and about 2% of slip and antiblock agents, all percents of the overall blend composition.
5) The A23 + A24 blend is a blend of about 83% A23, about 15% A24, and about 2% of slip and antiblock agents, all percents of the overall blend composition.
6) The A6 + A37 blend is a blend of 90% A6, and about 10% A37, all percents of the overall blend composition.

Examples 12 to 22 have the same composition as that of Examples 1 to 11 above, and are made by the same process, but have a 60 gauge (0.60 mils) thickness.

Examples 23 to 33 have the same composition as that of Examples 1 to 11 above, and are made by the same process, but have a 45 gauge (0.45 mils) thickness.

Polybutene can be included in the outer layer of a film of the invention to enhance sealing performance.

Another alternative is to substitute the A2 resin with another ethylene/alpha-olefin copolymer having similar density and structure but lower melt index. This alternative offers improved bubble strength without such a high level of radiation.

Alternatively, a crosslinking accelerator, such as A18, can be included in one or more of the layers of the film, other than the layer or layers containing the AO/VA resin. Examples include a layer containing the A1 or the A2 resin. The effect of the crosslinking accelerator is to promote the receptivity of that layer to electron-beam radiation.

Alternatively, EVA can be blended with the A2 resin, or the A2 resin can be substituted with EVA to provide a lower shrink tension film.

Table 8 discloses blend formulations useful in films of the present invention.

TABLE 8

Blend Formulations

| Blend | Composition |
|---|---|
| Skin1 | 85% A1 + 13.5% A5 + 1.5% slip package |
| Blend a | 75% A2 + 25% A9 |
| Blend b | 75% A2 + 25% A10 |
| Blend c | 75% A2 + 25% A12 |
| Blend d | 75% A2 + 25% A11 |
| Blend e | 70% A15 + 15% A13 + 13.5% A5 + 1.5% slip package |
| Blend f | 70% A1 + 15% A25 + 13.5% A5 + 1.5% slip package |
| Blend g | 90% A2 + 10% A18 |
| Blend h | 90% A2 + 10% A17 |
| Blend i | 70% A16 + 30% A14 |
| Blend j | 70% A15 + 30% A14 |

TABLE 8-continued

Blend Formulations

| Blend | Composition |
|---|---|
| Blend k | 85% A1 + 13.5% A5 + 1.5 % slip/antiblock package |
| Blend n | 70% A1 + 13.5% A5 + 1.5% slip/antiblock package + 15 % A25 |

Table 9 discloses additional five layer film formulations of the present invention, each having the structure:

Outer/intermediate/core/intermediate/outer

TABLE 9

Film Formulations

| Examples | Gauge (mils) | Racking Ratio | Outer % | Outer Resin | Intermediate % | Intermediate Resin | Core % | Core Resin |
|---|---|---|---|---|---|---|---|---|
| Ex. 34 | 0.75 | 5 × 5 | 5 | Skin 1 | 20 | A2 | 50 | A4 |
| Ex. 35 | 0.60 | 5 × 5 | 5 | Skin 1 | 20 | A2 | 50 | A4 |
| Ex. 36 | 0.45 | 5 × 5 | 5 | Skin 1 | 20 | A2 | 50 | A4 |
| Ex. 37 | 0.75 | 5 × 5 | 5 | Skin 1 | 15 | A2 | 60 | A4 |
| Ex. 38 | 0.60 | 5 × 5 | 5 | Skin 1 | 15 | A2 | 60 | A4 |
| Ex. 39 | 0.45 | 5 × 5 | 5 | Skin 1 | 15 | A2 | 60 | A4 |
| Ex. 40 | 0.60 | 5 × 5 | 5 | Blend f | 20 | A2 | 50 | A4 |
| Ex. 41 | 0.45 | 5 × 5 | 5 | Blend f | 20 | A2 | 50 | A4 |
| Ex. 42 | 0.60 | 5 × 5 | 5 | Skin 1 | 20 | A7 | 50 | A4 |
| Ex. 43 | 0.60 | 5 × 5 | 5 | Skin 1 | 15 | A7 | 60 | A4 |
| Ex. 44 | 0.60 | 5 × 5 | 5 | Skin 1 | 20 | Blend g | 50 | A4 |
| Ex. 45 | 0.60 | 5 × 5 | 5 | Skin 1 | 20 | Blend h | 50 | A4 |
| Ex. 46 | 0.60 | 5 × 5 | 5 | Skin 1 | 20 | blend a | 50 | A4 |
| Ex. 47 | 0.60 | 5 × 5 | 5 | Skin 1 | 20 | blend b | 50 | A4 |
| Ex. 48 | 0.60 | 5 × 5 | 5 | Skin 1 | 20 | blend c | 50 | A4 |
| Ex. 49 | 0.60 | 5 × 5 | 5 | Skin 1 | 20 | blend d | 50 | A4 |
| Ex. 50 | 0.60 | 5 × 5 | 5 | Skin 1 | 20 | A8 | 50 | A4 |
| Ex. 51 | 0.60 | 5 × 5 | 5 | Skin 1 | 20 | A9 | 50 | A4 |
| Ex. 52 | 0.60 | 5 × 5 | 5 | Blend e | 20 | A2 | 50 | A4 |
| Ex. 53 | 0.60 | 5 × 5 | 5 | Blend j | 20 | A2 | 50 | A4 |
| Ex. 54 | 0.60 | 5 × 5 | 5 | Blend i | 20 | A2 | 50 | A4 |

(In each of the examples of Table 9, A19 is sprayed onto inner of film for openability)

TABLE 10

Film Formulations

| Film Example | Outer layer % | Resin | Intermediate layers % | Resin | Core layer % | Resin | Free Shrink Avg (240° F.) | Free Shrink Avg (260° F.) | Modulus ×10³ | Haze |
|---|---|---|---|---|---|---|---|---|---|---|
| Ex. 55 | 10 | Skin 1 | 12.5 | A2 | 55 | A4 | 57 | 72 | 137 | 2.3 |
| Ex. 56 | 7.5 | Skin 1 | 15 | A2 | 55 | A4 | 66 | 72 | 151 | 2.0 |
| Ex. 57 | 5 | Skin 1 | 20 | A7 | 50 | A4 | 64 | 71 | 141 | 2.1 |
| Ex. 58 | 5 | Skin 1 | 20 | blend g | 50 | A4 | NM | 73 | 124 | NM |
| Ex. 59 | 5 | Skin 1 | 15 | A7 | 60 | A4 | 65 | 73 | 131 | NM |
| Ex. 60 | 5 | Skin 1 | 20 | blend a | 50 | A4 | 66 | 73 | 125 | NM |
| Ex. 61 | 5 | Skin 1 | 20 | blend d | 50 | A4 | 67 | 73 | 133 | NM |
| Ex. 62 | 5 | Skin 1 | 20 | blend b | 50 | A4 | 68 | 73 | 111 | NM |
| Ex. 63 | 5 | Skin 1 | 20 | A11 | 50 | A4 | NM | 74 | 111 | NM |
| Ex. 64 | 5 | Skin 1 | 20 | A9 | 50 | A4 | NM | 74 | 115 | NM |
| Ex. 65 | 5 | blend k | 20 | A2 | 50 | A4 | NM | 73 | NM | 1.9 |
| Ex. 66 | 5 | blend n | 20 | A2 | 50 | A4 | NM | 73 | 109 | NM |
| Ex. 67 | 5 | blend n | 15 | A2 | 60 | A4 | NM | 73 | NM | 2.8 |

A19 is sprayed onto inner surface of film for openability)
Each example of Table 10 had a thickness of 75 gauge (0.75 mils), and was oriented at a ratio of 5:1 in each of the longitudinal and transverse directions.
"NM" = not measured.

The experimental films of Table 12 were produced to optimize shrink and slip properties. Blends disclosed in Table 12 are identified in Table 11.

TABLE 11

| Blend | Composition |
|---|---|
| L | 98% A1 + 2% slip/antiblock additives |
| M | 83% A32 + 15% A1 + 2% slip/antiblock additives |
| O | 75% A1 + 14% A5 + 10% A34 + 1% slip/antiblock additives |
| P | 99% A2 + 1% slip additives |
| Q | 74% A2 + 25% A26 + 1% slip additives |
| R | 75% A2 + 24% A33 + 1% slip additives |
| S | 75% A7 + 24% A2 + 1% slip additives |

TABLE 12

| Film Example | Outer layers % | Resin | Intermediate layers % | Resin | Core layer % | Resin |
|---|---|---|---|---|---|---|
| Ex. 68 | 5 | Blend L | 20 | Blend P | 50 | A4 |
| Ex. 69 | 5 | Blend L | 20 | Blend Q | 50 | A4 |
| Ex. 70 | 7.5 | Blend L | 15 | Blend R | 55 | A4 |
| Ex. 71 | 5 | Blend M | 20 | A7 | 50 | A4 |
| Ex. 72 | 5 | Blend L | 20 | A7 | 50 | A4 |
| Ex. 73 | 5 | Blend M | 20 | A2 | 50 | A4 |
| Ex. 74 | 5 | Blend O | 20 | A2 | 50 | A4 |
| Ex. 75 | 5 | Blend L | 20 | A4 | 50 | A7 |
| Ex. 76 | 10 | Blend L | 25 | A4 | 30 | A7 |

Each example of Table 12 had a thickness of 75 gauge (0.75 mils), and was oriented at a ratio of 5:1 in each of the longitudinal and transverse directions.
In Examples 75 and 76, the AO/VA is in the intermediate layers.
No shrink whitening was observed in the films of Examples 68, 69, and 72

Three Layer Coextruded Films

Three layer palindromic films are prepared as in the above downwardly cast shrink films having the constructions disclosed in Table 13. Each three layer film provides high temperature shrink performance by incorporation of a polyolefin having a melting point greater than about 125 C.

TABLE 13

| Film Ex. | Outer Layer thickness; resin | | Core layer Thickness; resin | Outer Layer thickness; resin | |
|---|---|---|---|---|---|
| Ex. 77 | 20 | 98.5 % A40 + 1.5% A38 | 60; A4 | 20 | 98.5% A40 + 1.5 A38 |
| Ex. 78 | 20 | 90% A2 + 10% A42 | 60; A4 | 20 | A40 |
| Ex. 79 | 20 | *80% A7 + 20% A16 | 60; A4 | 20 | *80% A7 + 20% A16 |
| Ex. 80 | 20 | 60% A2 + 20% A14 + 18% A20 2% A38 | 60;A4 | 20 | 60% A2 + 20% A14 + 18% A20 + 2% A38 |
| Ex. 81 | 17.5 | A21 | 65; A4 | 17.5 | A21 |
| Ex. 82 | 20 | 60% A21 + 40% A2 | 70' A4 | 20 | 60% A21 + 40% A2 |
| Ex. 83 | 17.5 | 88% A43 + 2.5% A38 + 9.5% A44 | 65; A4 | 17.5 | 88% A43 + 2.5% A38 + 9.5% A44 |

TABLE 13-continued

| Film Ex. | Outer Layer thickness; resin | | Core layer Thickness; resin | Outer Layer thickness; resin | |
|---|---|---|---|---|---|
| Ex. 84 | 17.5 | 88% A45 + 2.5% A38 + 9.5% A46 | 65; A4 | 17.5 | 88% A45 + 2.5% A38 + 9.5% A46 |

Each example of Table 13 has a thickness of 75 gauge (0.75 mils), and is oriented at a ratio of 5:1 in each of the longitudinal and transverse directions, except that Exs. 82 and 83 are oriented at a ratio of 4.8:1 in each of the longitudinal and transverse directions.

Five Layer coextruded films are prepared and disclosed in Table 14. Each example of Table 14 has a thickness of 75 gauge (0.75 mils), except Example 103 which has a thickness of 70 gauge (0.70 mils), and is oriented at a ratio of 5:1 in each of the longitudinal and transverse directions.

TABLE 14

| Film Example | Outer layers | | Intermediate layers | | Core layer | | Comment |
|---|---|---|---|---|---|---|---|
| | % | Resin | % | Resin | % | Resin | |
| Ex. 85 | 10 | 88% A1 + 10% A18 + 2% slip/antiblock | 15 | 90% A2 + 9% A14 + 1% A41 | 50 | A4 | No Shrink whitening; good slip; low dosage |
| Ex. 86 | 10 | 88% A1 + 10% A18 + 2% slip/antiblock | 25 | 98% A4 + 2% A41 | 30 | A2 | High Modulus; good slip |
| Ex. 87 | 10 | 88% A1 + 10% A18 + 2% slip/antiblock | 25 | 98% A4 + 2% A41 | 30 | A41 | High Modulus; good slip |
| Ex. 88 | 10 | 88% A1 + 10% A18 + 2% slip/antiblock | 25 | 98% A4 + 2% A41 | 30 | 90% A2 + 10% A14 | High Modulus; good slip |
| Ex. 89 | 5 | 88% A1 + 10% A18 + 2% slip/antiblock | 20 | 99% A2 + 1% A41 | 50 | 95% A4 + 5% A35 | High temperature burn through resistance |
| Ex. 90 | 5 | 88% A1 + 10% A18 + 2% slip/antiblock | 20 | 99% A2 + 1% A41 | 50 | 95% A4 + 5% A36 | High temperature burn through resistance |

Films of the invention, as well as the comparative films, are made by downward coextrusion by techniques well known in the art as well as horizontally cast coextrusion, or "flat cast" techniques. The films are quenched using chilled water or chilled metal rolls to provide a relatively thick primary sheet or "tape". Films can optionally be irradiated by electron beam irradiation, e.g. at a dosage of between 50 and 235 kiloGrays. The primary sheets or tapes are reheated to their orientation temperature, and then stretched by a trapped bubble process or a tenter frame process. Films are stretched at any suitable ratio, e.g. about 5:1 in each of the longitudinal and transverse directions. In the case of the tenter process, simultaneous biaxial orientation is preferred over sequential orientation.

Where films are made by downward coextrusion, the melt strength of the extrudate becomes a significant issue. In this case, films having an AO/VA with a melt index of less than 2.0, such as less than 1.5 are preferred. The melt strength of the film, and therefore the melt index of the AO/VA, is less significant in flat cast film production. Films of the invention preferably do not exceed such thickness as to become optically inferior or exhibit excessive tension during the heat shrinking step of a particular packaging operation in which the film is used. Final film thicknesses can be varied, depending on process, end use application, etc. Typical thicknesses range from 0.1 to 5 mils, such as 0.2 to 2 mils, such as 0.3 to 1.5 mils, such as 0.4 to 1.0 mils, such as 0.5 to 0.8 mils, such as 0.75 mil.

Films of the invention have a haze value of preferably between 0.1 and 6, such as between 0.1 and 5, such as between 0.1 and 4, such as between 0.1 and 3, such as between 0.1 and 2.5, and such as between 0.1 and 2. Film of the invention can have a haze value of less than 6, 5 or less than 5, 4 or less than 4, 3.5 or less than 3.5, 3 or less than 3, 2.5 or less than 2.5, 2 or less than 2, or 1.

The multilayer film of the invention exhibits a free shrink (ASTM D 2732-83) at a temperature of 200° F. of at least 10% in either or both of the longitudinal and transverse directions, such as 15% in both the longitudinal and transverse directions, such as 20% in both the longitudinal and transverse directions. The multilayer film of the invention exhibits a free shrink (ASTM D 2732-83) at a temperature of 240° F. of at least 40% in either or both of the longitudinal and transverse directions, such as at least 45% in both the longitudinal and transverse directions, such as 50% in both the longitudinal and transverse directions, such as at least 60% in both the longitudinal and transverse directions, such as at least 70% in both the longitudinal and transverse directions. Preferred ranges for free shrink at a temperature of 240° F. are between 30% and 80% in each direction, such as between 40% and 75%, such as between 45% and 73% in either or both of the longitudinal and transverse directions, and such as between 49% and 72% in both the longitudinal and transverse directions.

The multilayer film of the invention exhibits a shrink tension (ASTM D 2838) at a temperature of 240° F. of between 50 and 400 psi, such as between 50 and 300 psi, such as between 100 and 250 psi, in either or both of the longitudinal and transverse directions. The multilayer film of the invention exhibits a shrink tension (ASTM D 2838) at a temperature of 240° F. of less than 400 psi, such as less than 300 psi, and less than 250 psi, in either or both of the longitudinal and transverse directions.

The multilayer film of the invention exhibits a shrink force (ASTM D 2838) at a temperature of 240° F. of between 20 and 180 grams, such as between 20 and 150 grams, or between 50 and 100 grams, in either or both of the longitudinal and transverse directions. The multilayer film of the invention exhibits a shrink force (ASTM D 2838) at a temperature of 240° F. of less than 180 grams, such as less than 150 grams, or less than 100 grams, in either or both of the longitudinal and transverse directions.

The multilayer film of this invention exhibits a Young's modulus of preferably at least 50,000 psi in either or both of the longitudinal directions, such as at least 60,000 psi, at least 70,000 psi, at least 90,000 psi, at least 100,000 psi, at least 110,000 psi, at least 115,000 psi, at least 120,000 psi, at least 130,000 psi, at least 135,000 psi, at least 140,000 psi, or at least 150,000 psi.

Films of the invention preferably have a Young's modulus value (ASTM D 882) of between 50,000 and 300,000 pounds per square inch, such as between 50,000 and 250,000, between 50,000 and 200,000 psi, or between 100,000 and 200,000 psi, in at least one of the longitudinal and transverse directions.

The multilayer film of the invention can be stretch oriented at stretching ratios such as at least about 3:1, at least about 3.25:1, at least about 3.5:1, at least about 4:1, at least about 4.5:1, at least 4.8:1, at least 5:1, at least 6:1, at least 6.5:1, or at least about 7:1 in either or both of the longitudinal and transverse directions. Ranges for stretch orientation ratio products, reported as the stretch ratio in the longitudinal direction multiplied by the stretch ratio in the transverse direction are preferably between 9 and 56, such as between 12 and 42, between 15 and 30, or between 20 and 25, such as 23, and such as 25. Ranges for orientation ratios are preferably between 3:1 and 8:1 in either or both of the longitudinal and transverse directions, and such as between 4:1 and 7:1 in both the longitudinal and transverse directions, or such as between 5:1 and 6:1 in both the longitudinal and transverse directions.

In films of the invention, the core layer is disposed between the two outer layers. Optionally, one or more additional layers can be disposed during extrusion within the film structure, e.g. between the core layer and one of the outer layers of a three layer film (thus providing a film of four or more layers), or between the core layer and an intermediate layer, or between an intermediate layer and an outer layer of a five layer film (thus providing a film of six or more layers).

Although not required to carry out this invention, the multilayer film of the invention may be crosslinked, such as by chemical means or by irradiation, especially by electron beam irradiation at a dosage of preferably between 20 and 250, such as between 40 and 225, between 50 and 200, or between 75 and 150 kiloGray. Although the films of the invention do not have to be irradiated, in one embodiment, irradiation can be used to improve processing of the film. Crosslinking may be enhanced by incorporating a crosslinking promoter, such as ethylene/propylene/diene terpolymer, into one or more film layers, in the manner disclosed in U.S. Pat. No. 5,993,922 (Babrowicz et al.), incorporated by reference herein in its entirety.

As may be seen from the examples the crosslink promoter may be added to either the skin layers and/or the substrate layers.

It is to be understood that variations of the invention can be made without departing from the scope of the invention, which is not limited to the specific embodiments and examples disclosed herein.

What is claimed is:

1. A multilayer oriented heat shrinkable film comprising:
   a) a core layer comprising a linear random ethylene/styrene copolymer; and
   b) a first and second outer layer, comprising an olefinic polymer;
   wherein the film has:
   i) a Young's modulus of between 50,000 and 200,000 pounds per square inch in at least one of the longitudinal and transverse directions;
   ii) a free shrink of between 40% and 80% at 240° F. in at least one of the longitudinal and transverse directions;
   iii) a shrink tension of between 50 and 400 pounds per square inch at 240° F. in at least one of the longitudinal and transverse directions; and
   iv) a haze of less than 6;
   wherein the ethylene/styrene copolymer comprises between 65% and 85%, by weight of the copolymer, of styrene; and wherein the first and second outer layer each comprise an olefinic polymer selected from the group consisting of ethylene/alpha olefin copolymer, ethylene/vinyl acetate copolymer, ethylene/alkyl acrylate copolymer, ethylene/acrylic acid copolymer, ionomer, butylene homopolymer and butylene copolymer, multicomponent ethylene/alpha-olefin interpenetrating network resin, high density polyethylene, a blend of high density polyethylene and ethylene/vinyl acetate copolymer, and a blend of high density polyethylene and low density polyethylene.

2. The film of claim 1 wherein the ethylene/styrene copolymer has a melt index of less than 1.5.

3. The film of claim 1 wherein the core layer comprising ethylene/styrene copolymer comprises between 30 and 80% of the total film thickness.

4. The film of claim 1 wherein the ethylene/styrene copolymer comprises homogeneous linear pseudo-random ethylene/styrene copolymer.

5. A multilayer oriented heat shrinkable film comprising:
   a) a core layer comprising a linear random ethylene/styrene copolymer;
   b) a first and second intermediate layer, comprising an ethylene copolymer having a melt index less than 2.0; and
   c) a first and second outer layer, comprising an olefinic polymer;
   wherein the film has:
   i) a Young's modulus of between 50,000 and 200,000 pounds per square inch in at least one of the longitudinal and transverse directions;
   ii) a free shrink of between 40% and 80% at 240° F. in at least one of the longitudinal and transverse directions;
   iii) a shrink tension of between 50 and 400 pounds per square inch at 240° F. in at least one of the longitudinal and transverse directions; and
   iv) a haze of less than 6;

wherein the ethylene/styrene copolymer comprises between 65% and 85%, by weight of the copolymer, of styrene; and wherein the first and second outer layer each comprise an olefinic polymer selected from the group consisting of ethylene/alpha olefin copolymer, ethylene/vinyl acetate copolymer, ethylene/alkyl acrylate copolymer, ethylene/acrylic acid copolymer, ionomer, butylene homopolymer and butylene copolymer, multicomponent ethylene/alpha-olefin interpenetrating network resin, high density polyethylene, a blend of high density polyethylene and ethylene/vinyl acetate copolymer, and a blend of high density polyethylene and low density polyethylene.

6. The film of claim 5 wherein the ethylene/styrene copolymer has a melt index of less than 1.5.

7. The film of claim 5 wherein the core layer comprising an ethylene/styrene copolymer comprises between 30 and 80% of the total film thickness.

8. The film of claim 5 wherein the ethylene/styrene copolymer comprises a homogeneous ethylene/styrene copolymer.

9. The film of claim 5 wherein the first and second intermediate layer each comprise a material selected from the group consisting of ethylene/alpha-olefin copolymer having a density of less than 0.916 grams/cubic centimeter, ethylene/vinyl acetate copolymer, ethylene/propylene/diene terpolymer, very low density polyethylene, a blend of very low density polyethylene and ethylene/vinyl acetate copolymer, and multicomponent ethylene/alpha-olefin interpenetrating network resin.

10. A multilayer oriented heat shrinkable film comprising:
    a) a core layer comprising an ethylene copolymer having a melt index less than 2.0;
    b) a first and second intermediate layer, comprising a linear random ethylene/styrene copolymer; and
    c) a first and second outer layer, comprising an olefinic polymer;
wherein the film has:
    i) a Young's modulus of between 50,000 and 200,000 pounds per square inch in at least one of the longitudinal and transverse directions;
    ii) a free shrink of between 40% and 80% at 240° F. in at least one of the longitudinal direction and transverse direction;
    iii) a shrink tension of between 50 and 400 pounds per square inch at 240° F. in at least one of the longitudinal and transverse directions; and
    iv) a haze of less than 6;
wherein the ethylene/styrene copolymer comprises between 65% and 85%, by weight of the copolymer, of styrene; and wherein the first and second outer layer each comprise an olefinic polymer selected from the group consisting of ethylene/alpha olefin copolymer, ethylene/vinyl acetate copolymer, ethylene/alkyl acrylate copolymer, ethylene/acrylic acid copolymer, ionomer, butylene homopolymer and butylene copolymer, multicomponent ethylene/alpha-olefin interpenetrating network resin, high density polyethylene, a blend of high density polyethylene and ethylene/vinyl acetate copolymer, and a blend of high density polyethylene and low density polyethylene.

11. The film of claim 10 wherein the ethylene/styrene copolymer has a melt index of less than 1.5.

12. The film of claim 10 wherein the core layer comprises a material selected from the group consisting of ethylene/alpha-olefin copolymer having a density of less than 0.916 grams/6cubic centimeter, ethylene/vinyl acetate copolymer, ethylene/propylene/diene terpolymer, very low density polyethylene, a blend of very low density polyethylene and ethylene/vinyl acetate copolymer, and multicomponent ethylene/alpha-olefin interpenetrating network resin.

13. The film of claim 10 wherein the first and second intermediate layers together comprise between 30% and 80% of the total film thickness.

14. The film of claim 10 wherein the ethylene/styrene copolymer comprises a homogeneous ethylene/styrene copolymer.

15. A multilayer oriented heat shrinkable film comprising:
    a) a core layer comprising a linear random ethylene/styrene copolymer; and
    b) a first and second outer layer, comprising an olefinic polymer;
wherein the film has:
    i) a Young's modulus of between 50,000 and 200,000 pounds per square inch in at least one of the longitudinal and transverse directions;
    ii) a free shrink of between 40% and 80% at 240° F. in at least one of the longitudinal and transverse directions;
    iii) a shrink force of between 20 and 180 grams at 240° F. in at least one of the longitudinal and transverse directions; and
    iv) a haze of less than 6;
wherein the ethylene/styrene copolymer comprises between 65% and 85%, by weight of the copolymer, of styrene; and wherein the first and second outer layer each comprise an olefinic polymer selected from the group consisting of ethylene/alpha olefin copolymer, ethylene/vinyl acetate copolymer, ethylene/alkyl acrylate copolymer, ethylene/acrylic acid copolymer, ionomer, butylene homopolymer and butylene copolymer, multicomponent ethylene/alpha-olefin interpenetrating network resin, high density polyethylene, a blend of high density polyethylene and ethylene/vinyl acetate copolymer, and a blend of high density polyethylene and low density polyethylene.

16. The film of claim 15 wherein the ethylene/styrene copolymer has a melt index of less than 1.5.

17. The film of claim 15 wherein the core layer comprising the ethylene/styrene copolymer comprises between 30 and 80% of the total film thickness.

18. The film of claim 15 wherein the ethylene/styrene copolymer comprises homogeneous linear pseudo-random ethylene/styrene copolymer.

19. A multilayer oriented heat shrinkable film comprising:
    a) a core layer comprising a linear random ethylene/styrene copolymer;
    b) a first and second intermediate layer, comprising an ethylene copolymer having a melt index less than 2.0; and
    c) a first and second outer layer, comprising an olefinic polymer;
wherein the film has:
    i) a Young's modulus of between 50,000 and 200,000 pounds per square inch in at least one of the longitudinal and transverse directions;
    ii) a free shrink of between 40% and 80% at 240° F. in at least one of the longitudinal and transverse directions;
    iii) a shrink force of between 20 and 180 grams at 240° F. in at least one of the longitudinal and transverse directions; and
    iv) a haze of less than 6;
wherein the ethylene/styrene copolymer comprises between 65% and 85%, by weight of the copolymer, of styrene; and wherein the first and second outer layer each comprise an olefinic polymer selected from the group consisting of ethylene/alpha olefin copolymer, ethylene/vinyl acetate copolymer, ethylene/alkyl acrylate copolymer, ethylene/acrylic acid copolymer, ionomer, butylene homopolymer and butylene copolymer, multicomponent ethylene/alpha-olefin interpenetrating network resin, high density polyethylene, a blend of high density polyethylene and ethylene/vinyl acetate copolymer, and a blend of high density polyethylene and low density polyethylene.

20. The film of claim 19 wherein the ethylene/styrene copolymer has a melt index of less than 1.5.

21. The film of claim 19 wherein the core layer comprising the ethylene/styrene copolymer comprises between 30 and 80% of the total film thickness.

22. The film of claim 19 wherein the ethylene/styrene copolymer comprises a homogeneous ethylene/styrene copolymer.

23. The film of claim 19 wherein the first and second intermediate layer each comprise a material selected from the group consisting of ethylene/alpha-olefin copolymer having a density of less than 0.916 grams/cubic centimeter, ethylene/vinyl acetate copolymer, ethylene/propylene/diene terpolymer, very low density polyethylene, a blend of very low density polyethylene and ethylene/vinyl acetate copolymer, and multicomponent ethylene/alpha-olefin interpenetrating network resin.

24. A multilayer oriented heat shrinkable film comprising:
   a) a core layer comprising an ethylene copolymer having a melt index less than 2.0;
   b) a first and second intermediate layer, comprising a linear random ethylene/styrene copolymer; and
   c) a first and second outer layer, comprising an olefinic polymer;
wherein the film has:
   i) a Young's modulus of between 50,000 and 200,000 pounds per square inch in at least one of the longitudinal and transverse directions;
   ii) a free shrink of between 40% and 80% at 240° F. in at least one of the longitudinal direction and transverse direction;
   iii) a shrink force of between 20 and 180 grams at 240° F. in at least one of the longitudinal and transverse directions; and
   iv) a haze of less than 6;
wherein the ethylene/styrene copolymer comprises between 65% and 85%, by weight of the copolymer, of styrene; and wherein the first and second outer layer each comprise an olefinic polymer selected from the group consisting of ethylene/alpha olefin copolymer, ethylene/vinyl acetate copolymer, ethylene/alkyl acrylate copolymer, ethylene/acrylic acid copolymer, ionomer, butylene homopolymer and butylene copolymer, multicomponent ethylene/alpha-olefin interpenetrating network resin, high density polyethylene, a blend of high density polyethylene and ethylene/vinyl acetate copolymer, and a blend of high density polyethylene and low density polyethylene.

25. The film of claim 24 wherein the ethylene/styrene copolymer has a melt index of less than 1.5.

26. The film of claim 24 wherein the core layer comprises a material selected from the group consisting of ethylene/alpha-olefin copolymer having a density of less than 0.916 grams/cubic centimeter, ethylene/vinyl acetate copolymer, ethylene/propylene/diene terpolymer, very low density polyethylene, a blend of very low density polyethylene and ethylene/vinyl acetate copolymer, and multicomponent ethylene/alpha-olefin interpenetrating network resin.

27. The film of claim 24 wherein the first and second intermediate layers together comprise between 30% and 80% of the total film thickness.

28. The film of claim 24 wherein the ethylene/styrene copolymer comprises a homogeneous ethylene/styrene copolymer.

* * * * *

UNITED STATES PATENT AND TRADEMARK OFFICE
CERTIFICATE OF CORRECTION

PATENT NO.    : 6,479,138 B1
DATED         : November 12, 2002
INVENTOR(S)   : Blaine Childress It is certified that error appears in the above-identified patent and that said Letters Patent is hereby corrected as shown below:

Column 25,
Line 65, "grams/6cubic centimeter" should read -- cubic centimeter --.

Signed and Sealed this

First Day of July, 2003

JAMES E. ROGAN
*Director of the United States Patent and Trademark Office*